US007616741B2

(12) United States Patent  (10) Patent No.: US 7,616,741 B2
Reynolds et al.  (45) Date of Patent: Nov. 10, 2009

(54) SYSTEM AND METHOD FOR FACILITATING A CUSTOM RING IN CONNECTION WITH A CALL

(75) Inventors: Douglas F. Reynolds, Austin, TX (US); Aaron Bangor, Austin, TX (US); Jeffrey L. Brandt, Cedar Park, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 410 days.

(21) Appl. No.: 10/774,351

(22) Filed: Feb. 6, 2004

(65) Prior Publication Data

US 2005/0175161 A1  Aug. 11, 2005

(51) Int. Cl.
 *H04M 1/64* (2006.01)
(52) U.S. Cl. .............. 379/88.17; 370/352; 370/354; 379/114.13; 379/142.12; 379/215.01; 379/373.02; 455/414.1; 455/461
(58) Field of Classification Search ............ 379/67.1, 379/142.17, 373.02, 373.01, 88.12, 88.19, 379/142.01, 211.01, 207.14, 215.01, 114.13, 379/88.17, 142.12; 370/352, 354; 709/206; 455/414.1, 461
See application file for complete search history.

(56) References Cited

U.S. PATENT DOCUMENTS

| | | | | |
|---|---|---|---|---|
| 4,856,055 | A * | 8/1989 | Schwartz | 379/373.02 |
| 5,905,786 | A * | 5/1999 | Hoopes | 379/142.12 |
| 5,933,778 | A * | 8/1999 | Buhrmann et al. | 455/461 |
| 6,154,644 | A * | 11/2000 | Murray | 455/414.1 |
| 6,272,215 | B1 * | 8/2001 | Cockrell et al. | 379/219 |
| 6,351,639 | B1 * | 2/2002 | Motohashi | 455/420 |
| 6,535,585 | B1 * | 3/2003 | Hanson et al. | 379/88.12 |
| 6,760,413 | B2 * | 7/2004 | Cannon et al. | 379/88.19 |
| 7,010,111 | B1 * | 3/2006 | Blackburn et al. | 379/207.14 |
| 7,042,989 | B2 * | 5/2006 | Lawson et al. | 379/88.17 |

(Continued)

FOREIGN PATENT DOCUMENTS

EP  1263204 A2  12/2002

(Continued)

OTHER PUBLICATIONS

Notice of Grounds for Rejection, JP Patent Application No. 2006-552170, mailed Apr. 14, 2009, 5 pages.

(Continued)

*Primary Examiner*—Gerald Gauthier
(74) *Attorney, Agent, or Firm*—Toler Law Group (57) ABSTRACT

A system and method are disclosed for facilitating a custom ring in connection with a call. A system that incorporates teachings of the present disclosure may include, for example, an electronic device operable to support telephonic communication. The electronic device may have a housing component at least partially defining an enclosure. A memory may be located within the enclosure and may be storing ring tone information representing a custom ring tone. The device may also have a user interface capable of receiving user inputs that could indicate, for example, a desire to place a call to a called party. In some embodiments, the device may have an output engine capable of initiating communication of the ring tone information to the called party such that a telephonic device of the called party outputs the select ring tone as an indication of the call.

41 Claims, 3 Drawing Sheets

U.S. PATENT DOCUMENTS

| | | | |
|---|---|---|---|
| 7,054,417 B2 * | 5/2006 | Casey et al. | 379/88.17 |
| 7,076,529 B2 * | 7/2006 | Koch et al. | 709/206 |
| 7,123,609 B2 * | 10/2006 | Glasser et al. | 370/354 |
| 7,123,707 B1 * | 10/2006 | Hiri et al. | 379/215.01 |
| 7,184,529 B1 * | 2/2007 | Taylor et al. | 379/114.13 |
| 7,280,530 B2 * | 10/2007 | Chang et al. | 370/352 |
| 2001/0041416 A1 | 11/2001 | Torii et al. | |
| 2004/0029561 A1 * | 2/2004 | Holter et al. | 455/405 |
| 2004/0032946 A1 * | 2/2004 | Koser et al. | 379/373.01 |
| 2004/0120505 A1 * | 6/2004 | Kotzin et al. | 379/373.01 |
| 2004/0233892 A1 * | 11/2004 | Roberts et al. | 370/352 |
| 2005/0031106 A1 * | 2/2005 | Henderson | 379/142.17 |
| 2005/0041793 A1 * | 2/2005 | Fulton et al. | 379/211.01 |
| 2005/0117726 A1 * | 6/2005 | DeMent et al. | 379/142.01 |
| 2007/0110036 A1 * | 5/2007 | Lang | 370/352 |

FOREIGN PATENT DOCUMENTS

| | | |
|---|---|---|
| EP | 1505814 A2 | 2/2005 |
| EP | 1528776 A2 | 5/2005 |
| JP | 2000197125 | 7/2000 |
| JP | 2001007902 | 1/2001 |
| JP | 2001224066 | 8/2001 |
| JP | 2002027112 | 1/2002 |
| JP | 2002064658 | 2/2002 |
| JP | 2003046664 | 2/2003 |
| WO | 0141416 A2 | 6/2001 |

OTHER PUBLICATIONS

PCT/US2005/002792, International Search Report mailed Nov. 1, 2005, 3 pages.

Great Britain Patent Application No. GB0614772.2, Examination Report dated Feb. 20, 2007, 2 pages.

Korean Patent Application No.10-2006-7014995, Notice of Preliminary Rejection dated Apr. 14, 2008, 4 pages.

Korean Patent Application No. 10-2006-7014995, Notice of Final Rejection dated Oct. 20, 2008, 2 pages.

French Patent Application No. EP05722612, European Search Report dated Dec. 19, 2007, 2 pages.

* cited by examiner

SYSTEM AND METHOD FOR FACILITATING A CUSTOM RING IN CONNECTION WITH A CALL

FIELD OF THE INVENTION

The present disclosure relates generally to telecommunication services, and more specifically to a system and method for facilitating a custom ring in connection with a call.

BACKGROUND

Most telephone service subscribers recognize that a ringing telephone indicates an incoming telephone call. In many cases, the telephone station rings in response to the receipt of a ring signal. For example, a telephone company providing Plain Old Telephony Service (POTS) may receive a call for a given subscriber and may initiate the sending of a ring signal to the home of that subscriber. A common technique involves feeding a 75 Volt, 20 Hz Alternating Current ringing current down one wire of a twisted pair telephone line. The signal is not often applied constantly to the line. The signal is usually applied in a pattern. For example, a United States service provider may use a repeated pattern that is two seconds on and four seconds off.

In some circumstances, a service provider may elect to use different ring signal patterns. For example, some service providers have begun to offer a distinctive ringing option to their subscribers. A subscriber may have multiple telephone numbers assigned to one physical telephone line. By assigning different signal patterns to each of the different telephone numbers, a service provider may be able to cause a subscriber telephone station to ring with a distinctive ring tone—indicating to the subscriber which of the telephone numbers is being called.

For example, SBC Communications, Inc. offers a MultiRing™ service that lets a subscriber know by the sound of the ringing who is being called. A subscriber to the service may have two or more different telephone numbers that will ring on a single telephone line. Each number has its own special ring and can be assigned, for example, to different household members. In operation, when a calling party calls one number, the telephone station may ring with one long ring and one short ring. When a different number is called, the telephone station may ring with two long rings.

While conventional distinctive ringing services represent a nice option for some subscribers, these services have several shortcomings.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Embodiments discussed below describe, in part, different approaches for utilizing custom ring tones in a packetized voice and/or Voice over Internet Protocol (VoIP) environment. From a high level, VoIP technology relates to a set of facilities for managing the delivery of voice information using the Internet Protocol (IP). Delivery of voice information using IP involves sending audio information in discrete packets rather than sending the information across the more traditional circuit-committed protocols of the public switched telephone network (PSTN). Though many of the embodiments discussed below focus on VoIP technology, other packetized call and/or circuit-based techniques may be used when implementing teachings disclosed herein.

An example technique incorporating teachings of the present disclosure may include receiving a signal that indicates a call directed to a VoIP-enabled telephone line and/or telephone station. In response, it may determined that the called party subscribes to a custom ring service and/or employs custom ring capable equipment. If the calling party has included custom ring information or elects to add custom ring information to the call, the custom ring information may be passed to the called party to facilitate a custom ring in connection with the call. In some embodiments, the custom ring information may include a file having a playable file format like .WAV, MP3, MIDI, .AU, .AIFF, and/or some other format.

By employing the teachings disclosed herein, an operator or telephone service provider may be able to offer a custom ring service to subscribers. The service may require and/or be implemented by specialized customer premises equipment (CPE). In some embodiments, the service may be implemented within a network environment. The network environment may include a PSTN, a cable network, the Public Internet, a managed IP network, and/or some other network capable of supporting the packet-based communication of information. The solution may allow, for example, calling party selected ring tones. In other words, a system incorporating teachings of the present disclosure may allow the calling party to dictate the ring tone heard by the called party.

In some embodiments, the ring tone may include a tune, a verbal announcement, or some other indication of an incoming call. Some ring tones may even represent a branded message or advertisement for the calling party. For example, a business may want the ring tone heard by the called party to include an announcement like "Company XYZ is calling." Allowing the calling party to select the ring tone for its own outbound calls may create several unique opportunities—opportunities that might otherwise be difficult to implement in systems that rely on the called party to select and/or assign ring tones.

Called party assigning of ring tones may occur, for example, in the cellular domain. With a cellular telephone, a user may download multiple ring tones and assign a unique ring tone to some or all of the contacts included in an address book stored on the cellular telephone. When someone calls, the called cellular telephone may compare the caller identification (Caller ID) information associated with the call to the contacts stored in the phone's address book. If the phone "recognizes" the calling party and the user has assigned a unique ring tone to that calling party, the telephone may play the assigned ring tone to let the user know who is calling. With such a system, a calling party does not influence which ring tone plays when he or she calls.

Figure 2:
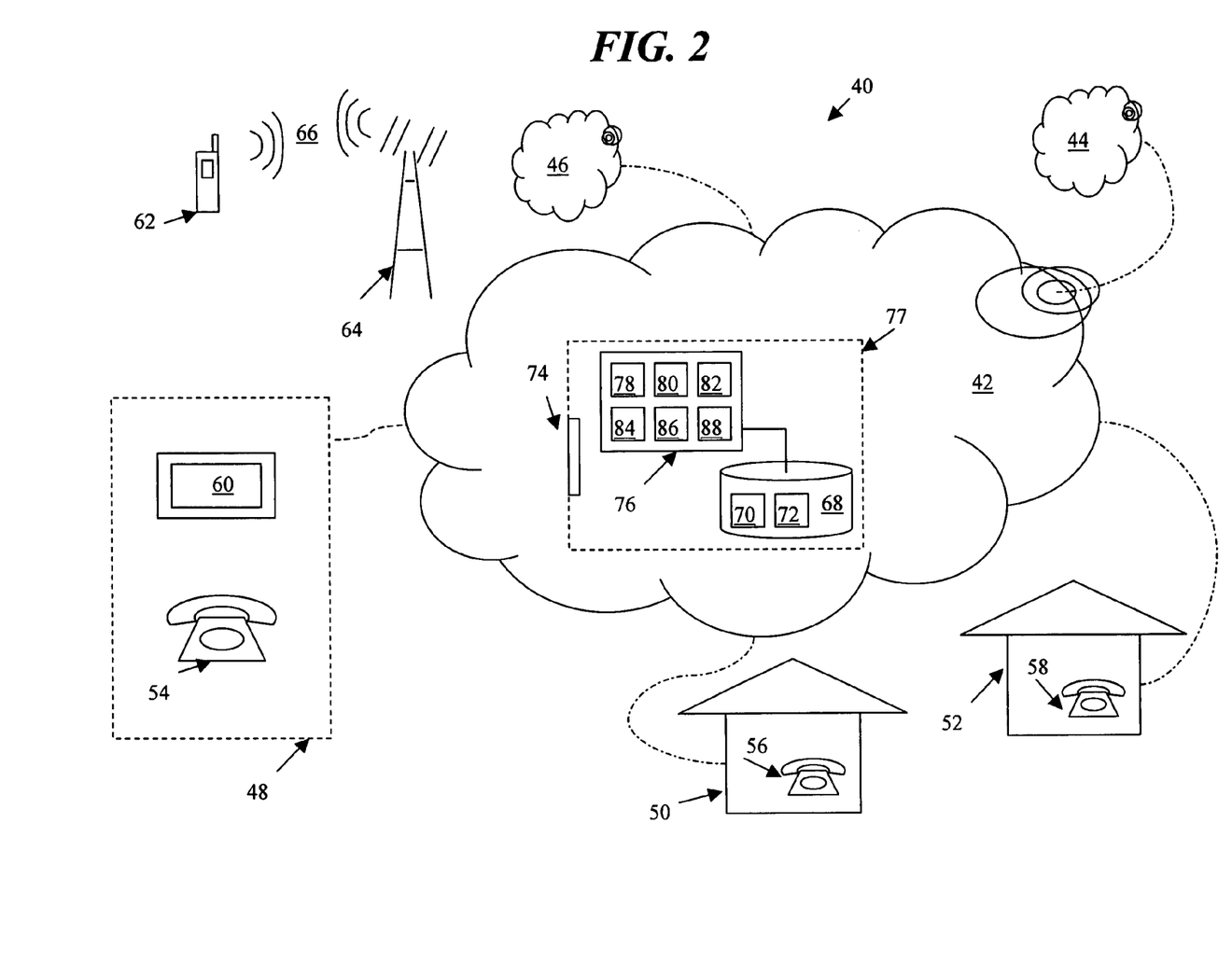
FIG. 2 shows one embodiment of a custom ring system that incorporates teachings of the present disclosure.

A system like the one depicted in FIG. 2 may allow ring tones to be sent in connection with packetized calls. For example, a Voice over Internet Protocol (VoIP) version of the system may include IP packets containing custom ring tone information in the collection of packets establishing the VoIP call. The ring tone packets may, for example, be loaded in front of other packets and/or placed in a specific location to facilitate an operator's custom ring service. In operation, such a system may recognize that a called party has some specialized CPE capable of playing a calling party selected ring tone to indicate an incoming call. The calls themselves may include voice calls, data calls, and/or a combination thereof. With such a solution, a VoIP or some other point-to-point capable network may be able to overcome some of the limitations and cost challenges typically associated with offering distinctive ring services in a communication network.

As mentioned above, FIG. 1 presents a flow diagram for a ring tone process 10 incorporating teachings of the present disclosure. At step 12, a calling party may begin the process of establishing a custom ring account. In some systems, an administrator may be able to assist and/or remotely manage the establishment of accounts. For example, an administrator may be presented with a graphical user interface (GUI) at a remote location. The administrator may interact with the GUI to effectuate the creation or modification of one or more custom rings and their respective triggers and messages.

Figure 1:
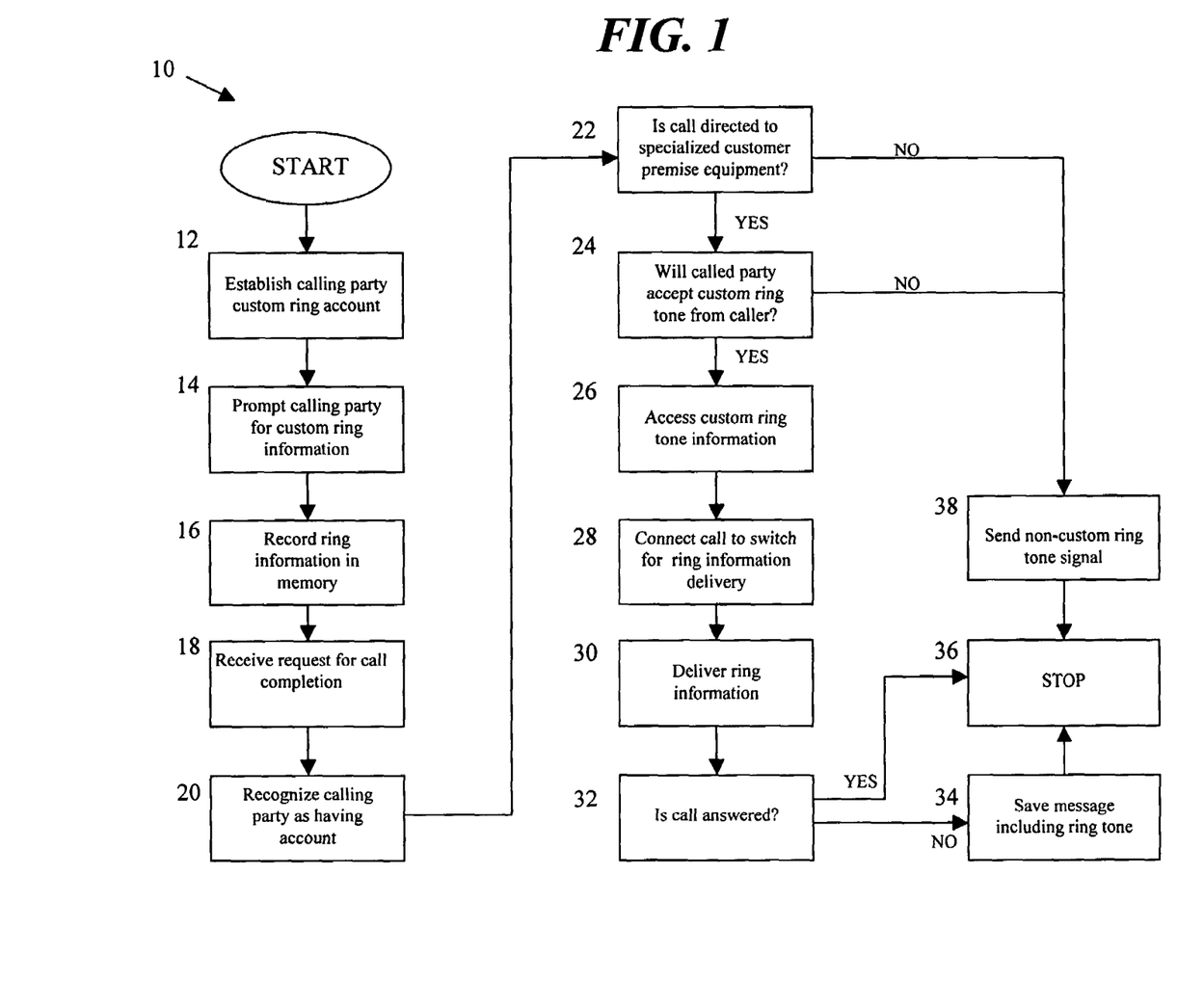
FIG. 1 presents a flow diagram for a ring tone process incorporating teachings of the present disclosure.

In operation, a user or subscriber may be prompted at step 14 to provide custom ring information and, at step 16, the information may be recorded into memory. The memory may be, for example, local to a user's CPE an/or within a remote network-based repository.

At step 18, a system implementing at least a portion of process 10 may receive a request for call completion. The request may be indicated by a calling signal communicated to a network node, a intra-device signal communicated within a piece of CPE, and/or some other technique capable of indicating a desire to make a call. Whatever format a triggering event takes, process 10 may advance to step 20, and it may be determined that the calling party desires to send custom ring tone information to the called party.

At step 22, the type of CPE being called may be determined. If the CPE supports advanced functionality like specialized ring tone features, process 10 may advance to step 24. At step 24, it may be determined that a called party does allow for calling party selected ring tones and at step 26 the calling party's ring tone information may be accessed. At step 28, a switch may establish a connection to the called party CPE and a signal may be communicated at step 30 to the specialized CPE such that the called party CPE outputs a custom ring. The specialized ring may have been selected by the calling party and could include a spoken message explaining that the incoming call is from the calling party, a tune, and/or some other special ring tone.

A system implementing process 10 may determine at step 32 whether or not the call was answered. If the call was not answered, process 10 may advance to step 34 and a calling party message may be recorded for the called party. In some embodiments, the message may include a representation of some or all of the custom ring information. If the call was answered, process 10 may advance to stop at step 36.

If it was determined at step 22 that the called CPE does not have the appropriate advanced feature set, process 10 may skip to step 38. At step 38, a system implementing process 10 may send a more traditional non-custom ring signal to indicate the existence of an incoming call and advance to stop at step 36.

As indicated above, a business may elect to use a custom ring tone service to deliver a branded ring tone like "Company XYZ is calling." Some subscribers may elect to block such ring tones. Other subscribers may elect to block all calling party selected ring tones, to block some subset of calling party ring tones, to allow all calling party selected ring tones, or to allow some subset of calling party selected ring tones. For example, a subscriber may maintain a list of calling parties from whom the subscriber will allow calling party selected ring tones. The subscriber may not want to maintain such a list and may elect instead to allow ring tones from all calling parties that do not block or hide their respective Caller ID.

However defined, a system incorporating teachings of the present disclosure may provide some mechanism for allowing called parties to control or limit the delivery and/or playing of calling party selected ring tones. As such, at step 24, process 10 may allow for determining if a called party wants to receive a calling party selected ring tone from the then-currently calling party. If the called party does not want to receive the calling party's custom ring tone, process 10 may advance to step 38. At step 38, a system implementing process 10 may send a more traditional non-custom ring signal to indicate the existence of an incoming call and advance to stop at step 36.

As mentioned above, FIG. 2 shows one embodiment of a custom ring system 40 that incorporates teachings of the present disclosure. As depicted, system 40 may include a communication network 42, which may include the PSTN, a cable network, a wireless service provider network, and/or some other network capable of supporting the communication of packetized information and/or point to point connections. Network 42 may be communicatively coupled to other networks like Public Internet 44 and cellular network 46.

In some embodiments, network 42 may provide telecommunication services to several subscribers. As shown, network 42 is communicatively coupled to premises 48, 50, and 52, and each of these premises has at least one telephone station identified as telephones 54, 56, and 58, respectively. These telephones may be capable of VoIP communications and the subscribers associated with each of these telephones may be VoIP service subscribers of the operator of network 42.

In addition to the depicted VoIP telephones, a given subscriber may have other electronic devices capable of receiving incoming calls. For example, the subscriber associated with premises 48 may have other telephonic devices like computer 60 and wireless communication device 62, which may be capable of communicating with a node 64 of cellular network 46. Wireless communication device 62 may be capable of Radio Frequency communication 66 that employs a 2.5G mobile technology like GPRS or EDGE. Device 62 may also employ higher bandwidth offerings like 3G/UMTS.

In operation, system 40 may rely on memory 68 to maintain a list 70 of subscriber information for a collection of subscribers that may possess CPE capable of outputting a custom ring tone. The collection of subscribers may include the subscribers residing at premises 48, 50, and 52, and the information may include Voice over Internet Protocol (VoIP) telephone numbers for each of the subscribers, calling party block lists, and/or alternative device addresses for the subscribers. In practice, some of the subscriber's devices may be capable of playing calling party selected ring tones while others are not. As such, system 40 may allow for delivery of custom ring information to one of the subscriber's devices and delivery of more traditional ring signals to another of the subscriber's devices.

Memory 68 and/or some other storage location may also include a calling party custom ring list 72 that includes the collection of subscribers who have pre-stored custom ring tones and a pointer to a file representing the custom ring of each of those subscribers.

Within system 40, a calling signal may be received via a network interface 74. The calling signal may indicate a desire to complete a call from a calling party to a called party and may be passed to a network node like computing platform 76, which may be implemented as one or more servers, computing devices, engines, mechanisms, and/or some other combination of hardware, software, and firmware. In some embodiments, computing platform 76, memory 68, and interface 74 may be associated with a ring tone center 77.

In operation, network interface 74 may receive a calling signal and output a trigger signal. A VoIP switch 78 may be responsive to the trigger signal and may be capable of supporting a plurality of simultaneous connections with remote premises. As such, VoIP switch 78 may also be able to initiate outbound VoIP calls to a plurality of subscribers. Platform 76 may also include a CPE status mechanism 80, which may, in connection with list 70, be capable of recognizing that a subscriber associated with premises 50 has a piece of VoIP CPE capable of outputting a custom ring tone. In response to this recognition, the call to that subscriber may be passed to an Internet Protocol (IP) custom ring tone server 82. Server 82 may take over the VoIP call and deliver a custom ring tone to the subscriber to indicate the existence of the call.

The to-be-delivered ring tone may have been pre-recorded and associated with a given calling party ID. For example, the subscriber associated with premises 52 may want her calls to be recognizable and may have requested delivery of a custom ring to parties that she calls. A calling signal indicating that the subscriber at premises 52 has placed a call to the subscriber at premises 50 may have been received by network interface 74 and the subscriber at premises 50 may have been called as a result. In addition, a pre-recorded message representing the custom ring tone of the subscriber at premises 52 may have been played to the subscriber at premises 50—informing that subscriber that the call was from the subscriber at premises 52.

In some embodiments, platform 76 may be capable of interacting with different types of network. For example, platform 76 may include a POTS interface 84, an xDSL interface 86, and/or a cable network interface 88. Other network interfaces could include a wide area and/or local area wireless network interface, a cellular network interface, and/or an interface to Public Internet 44.

Though the above described embodiment employs engines, mechanisms, and servers, to implement the features and functions of a VoIP custom ring service, other implementations and embodiments could be employed without departing form the teachings of the present disclosure. For example, many of the operations may be implemented by computing platform 76. Computing platform 76 may have access to a computer readable medium holding computer-readable data capable of directing platform 76 and related devices to maintain information representing a calling party selected ring tone, to recognize an event trigger signaling a request to place a VoIP call from the calling party to a called party, to initiate completion of the VoIP call, and to direct delivery of the information to a telephonic device of the called party in a format that allows the telephonic device to output the calling party selected ring tone as an indication of an incoming call.

The computer-readable medium may also have additional computer-readable data to determine if the called party desires delivery of the information. As indicated above, a business may elect to use a branded ring tone like "Company XYZ is calling." Some subscribers may elect to block such ring tones. Other subscribers may elect to block all calling party selected ring tones, to block some subset of calling party ring tones, to allow all calling party selected ring tones, or to allow some subset of calling party selected ring tones. For example, a subscriber may maintain a list of calling parties from whom the subscriber will allow calling party selected ring tones. The subscriber may not want to maintain such a list and may elect instead to allow ring tones from all calling parties that do not block or hide their respective Caller ID. However defined, a system incorporating teachings of the present disclosure may provide some mechanism for allowing called parties to control or limit the delivery and/or playing of calling party selected ring tones.

In preferred embodiments, messaging center 77 may support and process multiple calling signals and multiple custom rings. To facilitate implementation of a custom ring service, system 40 may have an administrator interface that allows for local and/or remote creation and modification of custom ring subscribers and lists. For example, an administrator may access such an interface and create an account for a new custom ring subscriber. With the help of the interface, the administrator may access a subscriber database to create the new account, which may be little more than a list of Caller ID information for the subscriber and some subscriber selected custom ring information. The administrator may then link and/or associate the account with a given calling signal and a given message file. The administrator may then "approve" the list for live operation—such that if the associated calling signal is received, messaging center 77 will begin attempting delivery of custom ring information in connection with VoIP telephone calls from the listed Caller ID numbers of the new subscriber.

As mentioned above, a system that incorporates teachings of the present disclosure may include several components. Depending on design objectives, a system designer may elect to incorporate at least some of the custom ring tone functionality into a piece of calling party CPE. The calling party CPE may include, for example, an electronic device operable to support telephonic communication. The electronic device may be a wireline telephone, a cellular telephone, a computer, a personal digital assistant, a modem, a router, some other device, and/or a combination thereof.

As mentioned above, FIG. 3 shows a piece of CPE that may be used to implement teachings disclosed herein. As shown, CPE 90 appears to be a laptop computer. Whatever its form factor, depicted CPE 90 may include a housing component 92 that at least partially defines an enclosure. A memory 94 may be located within the enclosure and may be storing ring tone information representing a custom ring tone. CPE 90 may also present a user with a surface 96. Surface 96 may include a keyboard, a mouse, arrow keys, and/or some other form of user interface. The user interface may be capable of receiving user inputs that could indicate, for example, a desire to place a call to a called party.

Figure 3:
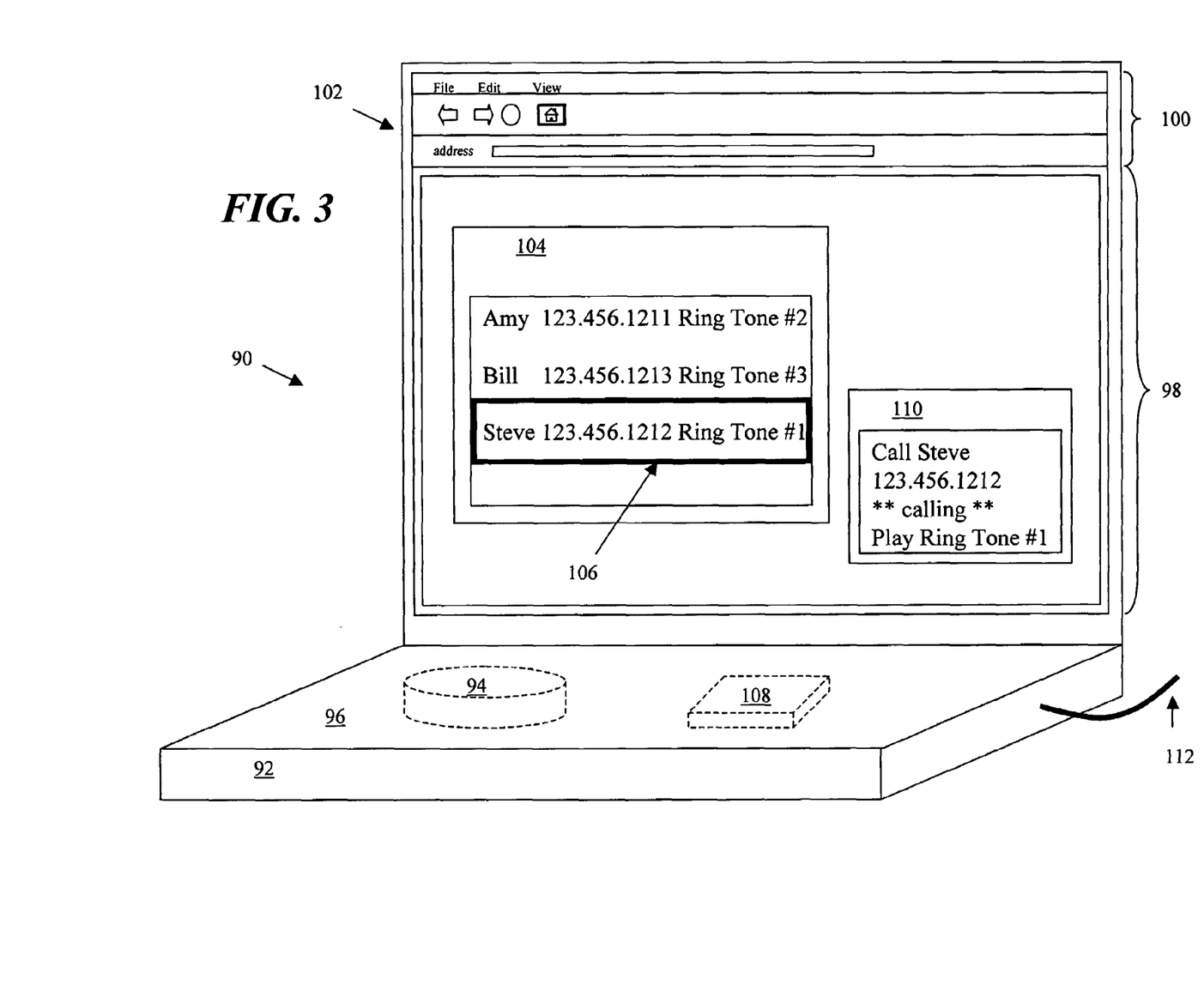
FIG. 3 illustrates a block diagram for a piece of customer premises equipment that may be used to implement teachings disclosed herein.

As shown, CPE 90 presents a browsing environment 98 and a browser bar 100 on a display 102. Within environment 98, a user may be presented with a GUI element 104 representing a stored address book. As shown by outlined box 106, the user may have selected to call "Steve". In operation, CPE 90 may have an output engine 108 capable of initiating communication of the ring tone information to a called party like Steve such that a telephonic device of the called party outputs the select ring tone as an indication of the call.

As shown, CPE 90 may also present a GUI element 110 that provides an indication or status of the call to "Steve". Various types of information may be included in GUI element 110 including, for example, Steve's name, telephone number, the calling party selected Ring Tone that is assigned to Steve, and the status of the call. Also depicted in connection with CPE 90 is a network connector 112. Network connector 112 may represent, for example, coaxial cable, twisted pair, fiber, an RF link such as GPRS or 802.11(x), and/or some other linking mechanism forming at least a part of a link communicatively coupling CPE 90 to a broader network and/or other telephonic devices.

In various embodiments, the telephones, computers, devices, servers, and/or platforms, described above, may take forms including wireless and cordless phones, personal digital assistants, cellular telephones, mobile telephones, laptop computers, desktop computers, mainframes, PSTN switches, Ethernet switches, routers, gateways, hardware, firmware, software, work stations, other options having some level of computing capability, and/or a combination thereof.

The methods and systems described herein provide for an adaptable implementation. Although certain embodiments have been described using specific examples, it will be apparent to those skilled in the art that the invention is not limited to these few examples. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A call indication method comprising:
   recognizing a request to complete a voice over internet protocol (VoIP) call to a called party;
   receiving custom ring information from a calling party of the VoIP call, the custom ring information representing a calling party selected ring tone to be played to the called party;
   determining whether the called party has a piece of telephonic equipment capable of outputting the calling party selected ring tone, wherein the piece of telephonic equipment is selected from a group consisting of a computer, a telephone communicatively coupled to a twisted pair network, a cordless telephone, a VoIP telephone, a cellular telephone, a fixed wireless telephone, and an 802.11(x) telephone;
   determining whether the calling party selected ring tone is allowed; and
   when the calling party selected ring tone is allowed and when the called party has a piece of telephonic equipment capable of outputting the calling party selected ring tone, initiating delivery of the custom ring information to a telephone of the called party.

2. The method of claim 1, further comprising utilizing a public switched telephone network (PSTN) node to perform at least one of the recognizing step, the receiving step, and the initiating step.

3. The method of claim 1, further comprising delivering at least a portion of the custom ring information in VoIP packets.

4. The method of claim 1, further comprising delivering the custom ring information across a wireline connection comprising a link of coaxial cable operable to carry data traffic.

5. The method of claim 1, wherein a VoIP switch initiates delivery of the custom ring information to the called party.

6. The method of claim 1, further comprising:
   prompting the calling party to communicate the custom ring information; and
   recording the custom ring information.

7. The method of claim 1, further comprising utilizing a piece of calling party customer premises equipment (CPE) to perform at least one of the recognizing step, the receiving step, and the initiating step.

8. The method of claim 1, wherein at least a portion of the custom ring information has a file format selected from the group consisting of a .WAV file, a .MIDI file, and a .AU file.

9. The method of claim 1, wherein at least a portion of the custom ring information represents a spoken message.

10. The method of claim 1, wherein recognizing the request to complete the VoIP call occurs after receiving the custom ring information.

11. The method of claim 1, further comprising storing the custom ring information in a memory residing in a piece of calling party customer premises equipment.

12. The method of claim 1, further comprising storing the custom ring information in a memory located within a service provider network.

13. The method of claim 12, further comprising:
    recognizing caller identification information of the calling party; and
    finding a location in the memory storing the custom ring information.

14. The call indication method of claim 1, wherein when the calling party selected ring tone is not allowed, initiating delivery of a non-custom ring signal to the called party.

15. The call indication method of claim 1, wherein when the calling party selected ring tone is not allowed, blocking delivery of the custom ring information to the called party.

16. The call indication method of claim 1, wherein determining whether the calling party selected ring tone is allowed includes:
    receiving caller identification information associated with the VoIP call; and
    using the caller identification information to determine whether the calling party is included in a list of allowed calling parties.

17. The call indication method of claim 16, wherein when the calling party is included in the list of allowed calling parties, initiating delivery of the custom ring information to the called party.

18. The call indication method of claim 16, wherein when the calling party is not included in the list of allowed calling parties, blocking delivery of the custom ring information to the called party.

19. The call indication method of claim 16, wherein when the calling party is not included in the list of allowed calling parties, initiating delivery of a non-custom ring signal to the called party.

20. The call indication method of claim 1, wherein determining whether the calling party selected ring tone is allowed includes determining whether the calling party selected ring tone includes a branded ring tone.

21. The call indication method of claim 20, wherein when the calling party selected ring tone includes the branded ring tone, blocking delivery of the custom ring information to the called party.

22. The call indication method of claim 21, wherein the branded ring tone includes an advertisement.

23. The call indication method of claim 20, wherein when the calling party selected ring tone includes the branded ring tone, initiating delivery of a non-custom ring signal to the called party.

24. The call indication method of claim 1, wherein determining whether the calling party selected ring tone is allowed includes determining whether caller identification information of the calling party is blocked.

25. The call indication method of claim 24, wherein when caller identification information of the calling party is blocked, blocking delivery of the custom ring information to the called party.

26. The call indication method of claim 24, wherein when caller identification information of the calling party is blocked, initiating delivery of a non-custom ring signal to the called party.

27. The call indication method of claim 24, wherein when caller identification information of the calling party is not blocked, initiating delivery of the custom ring information to the called party.

28. A ring tone delivery system, comprising:
an interface operable to receive a calling signal that indicates a request to complete a call from a calling party to a called party;
a network node communicatively coupled to the interface and operable to determine whether a calling party selected ring tone is allowed and when the calling party selected ring tone is allowed, to deliver packetized information representing the calling party selected ring tone to the called party; and
a memory maintaining information indicating an additional communication address for the called party, the additional communication address selected from the group consisting of an electronic mail address, a plain old telephony service telephone number, an instant messaging address, a short messaging service address, an enhanced messaging service address, a multimedia messaging service address, and a wireless telephone number.

29. The system of claim 28, wherein the network node comprises a voice over internet protocol (VoIP) switch operable to communicatively couple to a plurality of subscribers across links comprising twisted pair wiring.

30. The system of claim 28, wherein the network node is further operable to deliver packetized information across a cable network.

31. The system of claim 28, wherein the network node is further operable to deliver packetized information across an xDSL network.

32. The system of claim 28, further comprising a custom ring tone block list, wherein the network node is further operable to block delivery of the calling party selected ring tone when the custom ring tone block list indicates that the called party does not want to receive the calling party selected ring tone.

33. The system of claim 28, further comprising a broadband modem providing at least a portion of a link communicatively coupling the network node to a piece of telephonic equipment associated with the called party.

34. A system for facilitating a calling party selected ring tone in connection with a call, comprising:
an electronic device operable to support telephonic communication, the electronic device comprising a housing component;
a memory located within an enclosure at least partially formed by the housing component, the memory storing ring tone information representing a calling party selected ring tone;
a user interface for the electronic device operable to receive a user input indicating a desire to place a call to a called party; and
an output engine operable to initiate communication of the calling party selected ring tone information to the called party such that a telephonic device of the called party outputs the calling party selected ring tone to indicate the call when the calling party selected ring tone is allowed and when the called party has a piece of telephonic equipment capable of outputting the calling party selected ring tone, wherein the piece of telephonic equipment is selected from a group consisting of a computer, a telephone communicatively coupled to a twisted pair network, a cordless telephone, a voice over internet protocol (VoIP) telephone, a cellular telephone, a fixed wireless telephone, and an 802.11(x) telephone.

35. The system of claim 34, wherein the memory stores additional ring tone information representing a second select ring tone, wherein the calling party selected ring tone is associated with the called party and the second select ring tone is associated with a different party.

36. The system of claim 35, further comprising an electronic address book comprising a listing for the called party and a second listing for the different party.

37. A call indication method comprising:
recognizing a request to complete a call to a called party over a packet switched network;
receiving custom ring information from a calling party of the call, the custom ring information representing a calling party selected ring tone to be played to the called party;
determining whether a device of the called party is capable of playing the calling party selected ring tone, wherein the device of the called party is one of a computer, a telephone communicatively coupled to a twisted pair network, a cordless telephone, a voice over internet protocol (VoIP) telephone, a cellular telephone, a fixed wireless telephone, and an 802.11(x) telephone; and
when the device of the called party is capable of playing the calling party selected ring tone, initiating delivery of the custom ring information to the called party.

38. The call indication method of claim 37, wherein when the device of the called party is not capable of playing the calling party selected ring tone, initiating delivery of a non-custom ring signal to the called party.

39. A computer-readable medium having computer executable instructions that, when executed by a computer performs a task of directing delivery of information to a telephonic device of a called party, comprising computer-readable data to:
maintain information representing a calling party selected ring tone;
recognize an event trigger signaling a request to place a voice over internet protocol (VoIP) call from the calling party to a called party;
initiate completion of the VoIP call;
direct delivery of the information to a telephonic device of the called party in a format that allows the telephonic device to output the calling party selected ring tone as an indication of an incoming call;
determine whether the telephonic device of the called party is capable of playing the calling party selected ring tone, wherein the telephonic device of the called party is selected from a group consisting of a computer, a telephone communicatively coupled to a twisted pair network, a cordless telephone, a VoIP telephone, a cellular telephone, a fixed wireless telephone, and an 802.11(x) telephone; and when the telephonic device of the called party is capable of playing the calling party selected ring tone, initiating delivery of the custom ring information to the called party.

40. The computer-readable medium of claim 39, wherein when the telephonic device of the called party is not capable of playing the calling party selected ring tone, initiating delivery of a non-custom ring signal to the called party.

41. A ring tone delivery system, comprising:

an interface operable to receive a calling signal that indicates a request to complete a call from a calling party to a called party;

a network node communicatively coupled to the interface and operable to determine whether a calling party selected ring tone is allowed and when the calling party selected ring tone is allowed, to deliver packetized information representing the calling party selected ring tone to the called party; and a memory maintaining information indicating that the called party has a piece of telephonic equipment capable of outputting the calling party selected ring tone, wherein the piece of telephonic equipment is selected from a group consisting of a computer, a telephone communicatively coupled to a twisted pair network, a cordless telephone, a voice over internet protocol (VoIP) telephone, a cellular telephone, a fixed wireless telephone, and an 802.11(x) telephone.

* * * * *